United States Patent [19]

Yasaki et al.

[11] Patent Number: 5,525,307
[45] Date of Patent: Jun. 11, 1996

[54] EXHAUST GAS PURIFYING CATALYST FOR USE IN AN INTERNAL COMBUSTION ENGINE

[75] Inventors: Shigeru Yasaki, Tokyo-to; Yasutaka Yoshino, Machida; Kazunori Ihara, Iwakuni, all of Japan

[73] Assignees: Tokyo Roki Co., Ltd., Kanagawa-ken; Mazda Motor Corporation, Hiroshima-ken, both of Japan

[21] Appl. No.: 225,560

[22] Filed: Apr. 11, 1994

Related U.S. Application Data

[62] Division of Ser. No. 961,200, Oct. 14, 1992, Pat. No. 5,332,554, which is a continuation of Ser. No. 634,350, Dec. 26, 1990, abandoned.

[30] Foreign Application Priority Data

Dec. 29, 1989 [JP] Japan .................................. 1-341172
Nov. 16, 1990 [JP] Japan .................................. 2-312530

[51] Int. Cl.⁶ .................................................. B01D 50/00
[52] U.S. Cl. ........................ 422/171; 422/177; 423/220; 423/230; 502/304
[58] Field of Search .................................. 422/171, 177, 422/180; 502/304, 325, 339, 514; 423/220, 230; 60/299, 303, 304

[56] References Cited

U.S. PATENT DOCUMENTS

| | | |
|---|---|---|
| 3,188,309 | 2/1980 | Völker et al. . |
| 3,891,575 | 6/1975 | Bräutigam et al. . |
| 4,118,199 | 10/1978 | Völker et al. . |
| 4,335,023 | 6/1982 | Dettling et al. . |
| 4,711,009 | 12/1987 | Cornelison et al. . |
| 4,985,210 | 1/1991 | Minami . |
| 4,985,211 | 1/1991 | Akiyama et al. . |

FOREIGN PATENT DOCUMENTS

61-46252 3/1986 Japan .

*Primary Examiner*—Timothy M. McMahon
*Attorney, Agent, or Firm*—Wenderoth, Lind & Ponack

[57] ABSTRACT

An exhaust gas purifying catalyst for use in an internal combustion engine includes a porous monolithic carrier, a catalyst coating layer formed on a surface of the monolithic carrier and containing a catalytic material capable of purifying exhaust gases, and a palladium-supporting layer formed in the catalyst coating layer at a location close to an exhaust gas inlet end of the monolithic carrier. Palladium is distributed at a high concentration in the palladium-supporting layer.

17 Claims, 5 Drawing Sheets

UNIT : mm

UNIT : mm

UNIT : mm

5,525,307

EXHAUST GAS PURIFYING CATALYST FOR USE IN AN INTERNAL COMBUSTION ENGINE

This is a division of Ser. No. 07/961,200, filed Oct. 14, 1992, now U.S. Pat. No. 5,332,554, which is a continuation of Ser. No. 07/634,350, filed Dec. 26, 1990, now abandoned.

BACKGROUND OF THE INVENTION

1. Field of the Invention

The present invention relates generally to an exhaust gas purifying catalyst for use in an internal combustion engine and, more particularly, to an exhaust gas purifying catalyst including a porous monolithic carrier and a catalyst coating layer formed on the surface of the monolithic carrier.

2. Description of the Prior Art

Some conventionally known exhaust gas purifying catalysts include a porous monolithic carrier made of cordierite or the like and a catalyst coating layer formed on a surface of the monolithic carrier. The catalyst coating layer contains catalytic materials for expediting oxidation of hydrocarbons (HC), carbon monoxide (CO), or the like and reduction of nitrogen oxide (NOx) contained in exhaust gases. Materials containing noble metal components or other metal components, for example platinum, rhodium, and the like (these materials are hereinafter referred to as catalytic noble metals), are generally employed as the catalytic materials. In such conventional exhaust gas purifying catalysts, the catalytic noble metals are substantially uniformly distributed. However, the temperature and the exhaust gas speed generally vary from location to location in the exhaust gas purifying catalysts, while the exhaust gas purifying ratio of the catalytic noble metals depends on the catalyst temperature and the gas speed. Accordingly, the conventional exhaust gas purifying catalysts, in which the catalytic noble metals are uniformly distributed, cannot sufficiently enhance the exhaust gas purifying ratio.

Japanese Laid-open Patent Application No. 61-46252 discloses an exhaust gas purifying device, in which the distribution of concentration of a catalytic noble metal partially varies according to the distribution of temperature or that of gas speed in an exhaust gas purifying catalyst.

FIG. 1 depicts the structure of such an exhaust gas purifying device, which comprises a substantially cylindrical housing 102 communicating with an exhaust gas passage 101 and an exhaust gas purifying catalyst 103 disposed in the housing 102. The exhaust gas purifying catalyst 103 includes a monolithic carrier and a catalyst coating layer containing catalytic noble metals and formed on the surface of the monolithic carrier. This catalyst 103 is divided into three sections 104, 105 and 106, the first section (104) of which is high in concentration of the catalytic noble metals and the second and third sections (105, 106) of which are low in concentration of the catalytic noble metals. The third section 106 is substantially constant in width and is formed upstream from any other sections 104 and 105 in a direction of travel of exhaust gases. The first section 104 adjoins the third section 106 and has an elongated portion extending along the longitudinal axis of the catalyst 103 so that the longitudinal cross section thereof may be in the form of a figure "T". Around the elongated portion of the first section 104 is formed the third section 105.

However, when the engine is cold and the temperature of exhaust gases is low, the exhaust gas purifying catalyst 103 in the device of FIG. 1 is low in catalyst activity, thus lowering the purification ratio of the exhaust gases. Furthermore, the catalyst temperature near the longitudinal axis is generally higher than that of the circumferential portion. In the conventional catalyst 103, however, since the concentration of the catalytic noble metals is high at the location near the longitudinal axis of the catalyst, the temperature of this location becomes particularly high, thereby causing sintering of the catalytic noble metals, particularly platinum. As a result, the exhaust gas purifying catalyst 103 is thermally deteriorated.

SUMMARY OF THE INVENTION

The present invention has been developed to overcome the above-described disadvantages.

It is accordingly an object of the present invention to provide an exhaust gas purifying catalyst for use in an internal combustion engine, which is capable of improving the purification ratio of exhaust gases by sufficiently enhancing the catalyst activity when the engine is cold and the temperature of exhaust gases is low.

Another object of the present invention is to provide an exhaust gas purifying catalyst of the above-described type which is simple in construction and can be readily manufactured at a low cost.

In accomplishing these and other objects, an exhaust gas purifying catalyst according to the present invention comprises a porous monolithic carrier, a catalyst coating layer formed on the surface of the monolithic carrier and containing a catalytic material capable of purifying exhaust gases, and a palladium-supporting layer formed in the catalyst coating layer at a location close to an exhaust gas inlet end of the monolithic carrier. Palladium is distributed at a high concentration in the palladium-supporting layer.

According to the present invention, since the palladium-supporting layer having a high concentration of palladium, which greatly expedites oxidation reaction, is formed near the exhaust gas inlet end of the exhaust gas purifying catalyst, the oxidation of hydrocarbons, carbon monoxide, or the like contained in exhaust gases is considerably enhanced in the palladium-supporting layer, thereby generating a large amount of heat. Because of this, the temperature of exhaust gases is raised in the palladium-supporting layer. The exhaust gases of a high temperature then pass through the region of the catalyst coating layer formed downstream from the palladium-supporting layer and raise the temperature of this region, thereby raising the activity of the entire exhaust gas purifying catalyst. As a result, the low-temperature activity of the catalyst is enhanced and the exhaust gas purifying ratio is improved.

Although the temperature of the catalyst becomes high in the palladium-supporting layer, sintering thereof never takes place because palladium is superior in resistance to heat. Therefore, thermal deterioration of the catalyst can be effectively prevented.

An exhaust gas purifying device includes an exhaust gas manifold, a first converter disposed downstream from the exhaust gas manifold and accommodating a catalyst for performing pretreatment with respect to exhaust gases, and a second converter disposed downstream from the first converter and accommodating the above-described exhaust gas purifying catalyst.

In a method of manufacturing the above-described exhaust gas purifying catalyst, a first layer of alumina is initially formed on a porous monolithic carrier. A second layer of cerium oxide is then formed on the first layer.

Thereafter, a palladium-supporting layer is formed in the second layer at a location close to an exhaust gas inlet end of the monolithic carrier.

BRIEF DESCRIPTION OF THE DRAWINGS

These and other objects and features of the present invention will become more apparent from the following description taken in conjunction with a preferred embodiment thereof and with reference to the accompanying drawings, throughout which like parts are designated by like reference numerals, and wherein.

DETAILED DESCRIPTION OF THE PREFERRED EMBODIMENTS

Figure 1:
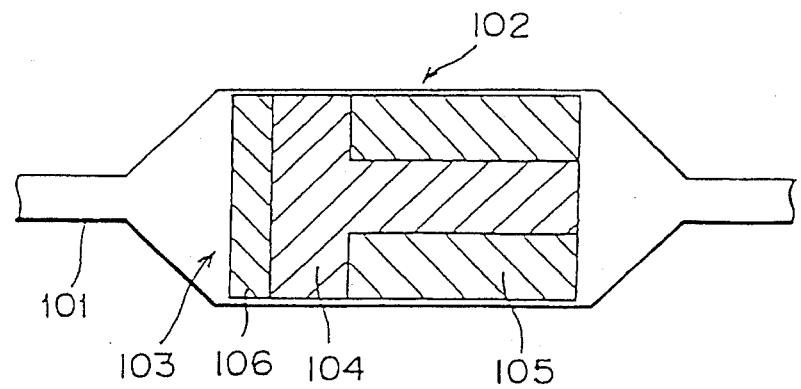
FIG. 1 is a longitudinal sectional view of a conventional exhaust gas purifying device.
Figure 2:
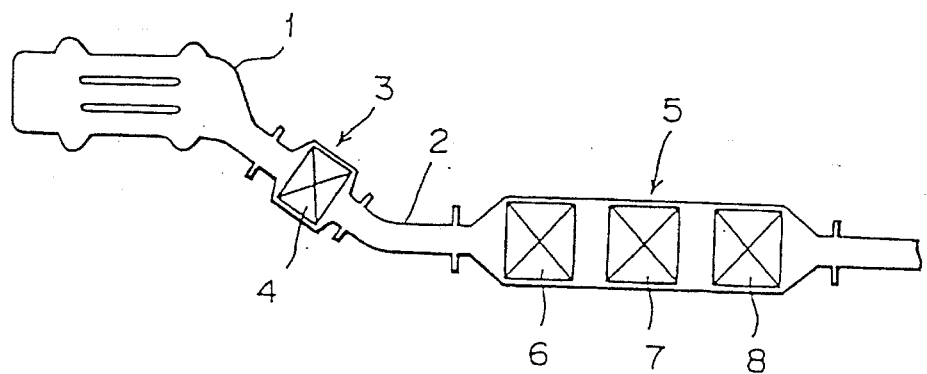
FIG. 2 is a schematic longitudinal sectional view of an exhaust gas purifying device equipped with an exhaust gas purifying catalyst according to the present invention.

Referring now to the drawings, there is shown in FIG. 2 an exhaust gas purifying device for an internal combustion engine, which includes an exhaust gas manifold 1, a substantially cylindrical preconverter 3 disposed downstream from the exhaust gas manifold 1 and connected thereto via an exhaust gas passage 2, and a substantially cylindrical main converter 5 disposed downstream from the preconverter 3 and connected thereto via the exhaust gas passage 2. The preconverter 3 accommodates a substantially columnar deposit catalyst 4 for performing pretreatment of exhaust gases. The main converter 5 converts hydrocarbons (HC), carbon monoxide (CO), or the like contained in the exhaust gases to carbon dioxide and water, and also converts nitrogen oxides (NOx) to nitrogen. The main converter 5 accommodates substantially columnar first and second exhaust gas purifying catalysts 6 and 7 for expediting oxidation and reduction, and a substantially columnar oxidation catalyst 8 for expediting oxidation only, all of which are disposed in this order in a direction of travel of exhaust gases.

Figure 3:
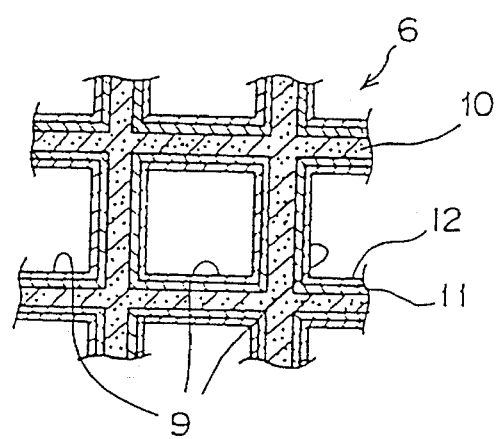
FIG. 3 is a transverse sectional view of a first or second catalyst according to the present invention.

As shown in FIG. 3, the first exhaust gas purifying catalyst 6 is a monolithic catalyst and includes a monolithic carrier 10 in the form of a honeycomb structure having a large number of small holes 9 extending in the longitudinal direction thereof, a first catalyst coating layer 11 formed on the monolithic carrier 10, and a second catalyst coating layer 12 formed on the first catalyst coating layer 11. The first catalyst coating layer 11 includes alumina as a main component and a platinum component (hereinafter referred to simply as platinum) and a rhodium component (hereinafter referred to simply as rhodium) as a catalyst component whereas the second catalyst coating layer 12 includes cerium oxide ($C_eO_2$) as a main component and a palladium component (hereinafter referred to simply as palladium) as a catalyst component. A method of forming these catalyst coating layers 11 and 12 is described later.

Figure 4:
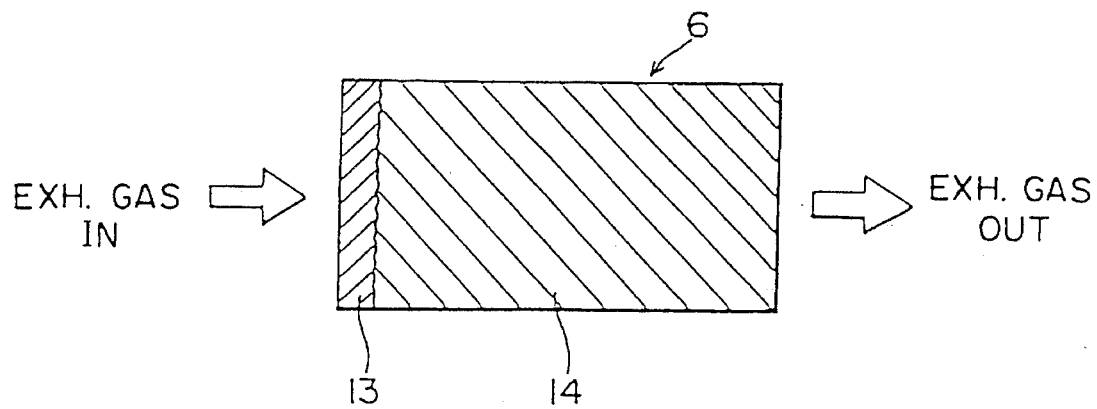
FIG. 4 is a longitudinal sectional view of the first or second catalyst.

As shown in FIG. 4, palladium is distributed in high concentration in the second catalyst coating layer 12 in the vicinity of an exhaust gas inlet of the first exhaust gas purifying catalyst 6, thereby forming a palladium-supporting layer 13. In contrast, the second catalyst coating layer 12 formed downstream from the palladium-supporting layer 13 contains no palladium, thereby forming a non-palladium layer 14.

It is to be noted that the second exhaust gas purifying catalyst 7 is similar in construction to the first exhaust gas purifying catalyst 6.

A method of manufacturing the first exhaust gas purifying catalyst 6 is discussed hereinafter with reference to FIGS. 2 to 4 and FIG. 5 indicative of a flow diagram.

(1) Process P1

540 grams of gamma-alumina ($\gamma$-$Al_2O_3$), 60 grams of boehmite and 1 liter of water are initially mixed, and 10 milliliters of nitric acid is added thereto, thereby preparing a slurry for the first catalyst coating layer 11. A desired amount of slurry can be prepared by increasing or decreasing the amount of each material to be used while the above mixing ratio is kept constant.

(2) Process P2

The monolithic carrier 10 is dipped into the slurry. The monolithic carrier 10 is made of cordierite in cylindrical form and has a diameter of 1 inch (25.4 mm) and a longitudinal length of 2 inches (50.8 mm). The number of small holes 9 extending in the longitudinal direction of the monolithic carrier 10 is 400 per one square inch cross section.

(3) Process P3

The monolithic carrier 10 is taken out of the slurry and is subjected to an air blast to remove excessive slurry.

(4) Process P4

The monolithic carrier 10, which has been subjected to the air blast, is dried at 250° C. for two hours.

(5) Process P5

The dried monolithic carrier 10 is heated at 650° C. for two hours so that the first catalyst coating layer 11 may be formed on the surface of the monolithic carrier 10. In the above processes P2–P5, the first catalyst coating layer 11 is regulated to be 14% by weight with respect to the monolithic carrier 10.

(6) Process P6

A solution of platinum chloride having an appropriate concentration and a solution of rhodium chloride having an appropriate concentration are prepared.

(7) Process P7

The monolithic carrier 10, on which the first catalyst coating layer 11 is formed, is dipped into the solution of platinum chloride and in turn into the solution of rhodium chloride so that platinum and rhodium may be supported by the first catalyst coating layer 11. The amount of platinum and rhodium in the first catalyst coating layer 11 is 1.6 g/l in total and the concentration of both the solutions and the immersion time are regulated so that the ratio between platinum and rhodium will be 5:1.

(8) Process P8

The monolithic carrier 10 supporting platinum and rhodium is dried.

(9) Process P9

The monolithic carrier 10 is heated so that platinum and rhodium may be fixed in the first catalyst coating layer 11.

(10) Process P10

The second catalyst coating layer 12 is further formed on the first catalyst coating layer 11 of the monolithic carrier 10. The method of forming the second catalyst coating layer 12 is similar to that of forming the first catalyst coating layer 11 (Processes P1–P5) except that the components of the slurry differ. The slurry for the second catalyst coating layer 12 is prepared by mixing 540 grams of cerium oxide ($C_eO_2$), 60 grams of boehmite and 1 liter of water and by adding 10 milliliters of nitric acid thereto. A desired amount of slurry can of course be prepared by increasing or decreasing the amount of each material to be used while the above mixing ratio is kept constant. In this process P10, the second catalyst coating layer 12 is regulated to be 28% by weight with respect to the monolithic carrier 10.

(11) Process P11

A solution of palladium chloride having an appropriate concentration is prepared.

(12) Process P12

Figure 6:
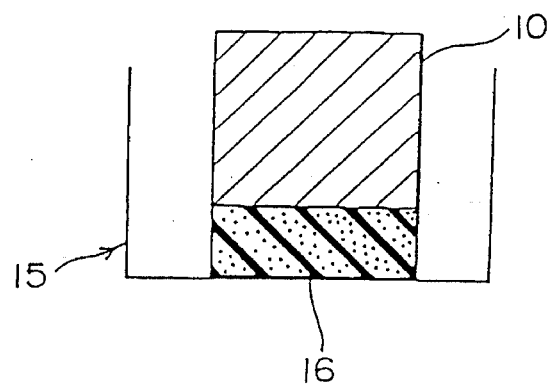
FIG. 6 is a schematic longitudinal sectional view of a water absorbing material and a monolithic carrier placed in an impregnating receptacle.

As shown in FIG. 6, a water absorbing material 16 of sponge, cloth, or the like is placed in an impregnating receptacle and is caused to absorb the solution of palladium chloride. The water absorbing material 16 is required to be formed so as to be capable of properly contacting with one surface of the monolithic carrier 10.

(13) process P13

As shown in FIG. 6, the monolithic carrier 10, on which the first and second catalyst coating layers 11 and 12 are formed, is placed on the water absorbing material 16 so that one surface of the monolithic carrier 10 to be disposed on the inlet side of exhaust gases will be in contact with the upper surface of the water absorbing material 16. Thereafter, the monolithic carrier 10 is depressed against the water absorbing material 16 for a given time period so that palladium will be supported by the second catalyst coating layer 12 on the exhaust gas inlet side surface of the monolithic carrier 10. In this event, the concentration of the solution of palladium chloride and the pressure applied to the monolithic carrier 10 are regulated so that the palladium-supporting layer 13 will be 5 mm in thickness in the longitudinal direction of the monolithic carrier 10 and the amount of supported palladium (the concentration of palladium distributed) will be 0.5 g/l.

Figure 7:
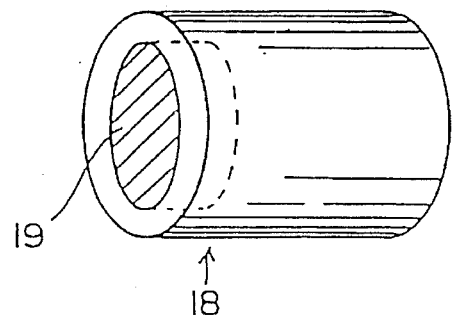
FIG. 7 is a perspective view of an exhaust gas purifying catalyst having a palladium-supporting layer in a portion of an internal surface thereof.

This method, in which the palladium-supporting layer 13 is formed on the monolithic carrier 10 using the water absorbing material 16, makes it highly possible to form in a manner a desired value of the thickness of the palladium-supporting layer 13 in the longitudinal direction of the monolithic carrier 10, and also makes it possible to considerably reduce the loss of the solution of palladium-chloride. Furthermore, a palladium-supporting layer 13 having a desired cross section can be formed on one surface of the monolithic carrier 10 by changing the shape of the mating surface of the water absorbing material 16 with the monolithic carrier 10. As shown in FIG. 7, for example, a palladium-supporting layer 19 can be formed in an internal surface of an exhaust gas purifying catalyst 18 only in the vicinity of one end surface thereof.

Conventionally, the formation of such a palladium-supporting layer is performed by dipping a given length of a monolithic carrier into a solution of palladium chloride contained in an impregnating receptacle, or by spraying the solution of palladium chloride to the end surface of the monolithic carrier.

However, the former method is disadvantageous in that the palladium-supporting layer cannot be formed only in a portion near the end surface of the catalyst 18 and the concentration of the solution of palladium chloride must be changed when the thickness of the palladium-supporting layer is regulated.

On the other hand, the latter method is disadvantageous in that the palladium-supporting layer cannot be formed only in a portion near the end surface of the catalyst 18 and the thickness of the palladium-supporting layer cannot be readily regulated, and in that the loss of the solution of palladium chloride is increased.

(14) Process P14

The monolithic carrier 10 having the second catalyst coating layer 12 supporting palladium is dried at 250° C. for two hours.

(15) Process P15

The monolithic carrier 10 is heated so that the palladium will be fixed in the second catalyst coating layer 12.

Figure 8:
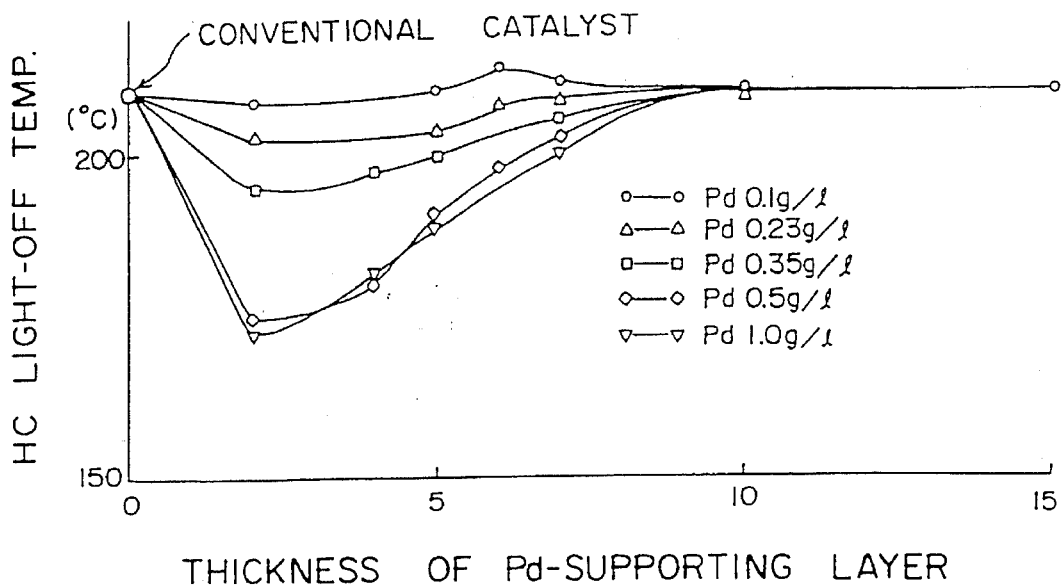
FIG. 8 is a graph indicative of the relationship between the HC light-off temperature and the thickness of the palladium-supporting layer of various catalysts.

FIG. 8 is a graph indicating the results of measurements of the temperature at which the hydrocarbon purification ratio of exhaust gas purifying catalysts becomes 50%. This temperature is hereinafter referred to as the HC light-off temperature, which is an index indicative of the low-temperature activity of catalysts. As the HC light-off temperature becomes lower, the low-temperature activity of catalysts are enhanced. Samples of the exhaust gas purifying catalysts 6 were prepared substantially in accordance with the above manufacturing method by changing the amount of palladium supported in the palladium-supporting layer 13 in the range of 0.1–1.0 g/l and by changing the thickness of the palladium-supporting layer 13 in the longitudinal direction of the monolithic carrier in the range of 2–15 mm.

The graph of FIG. 8 also indicates the HC light-off temperature of an exhaust gas purifying catalyst prepared by the following conventional method.

Figure 5:
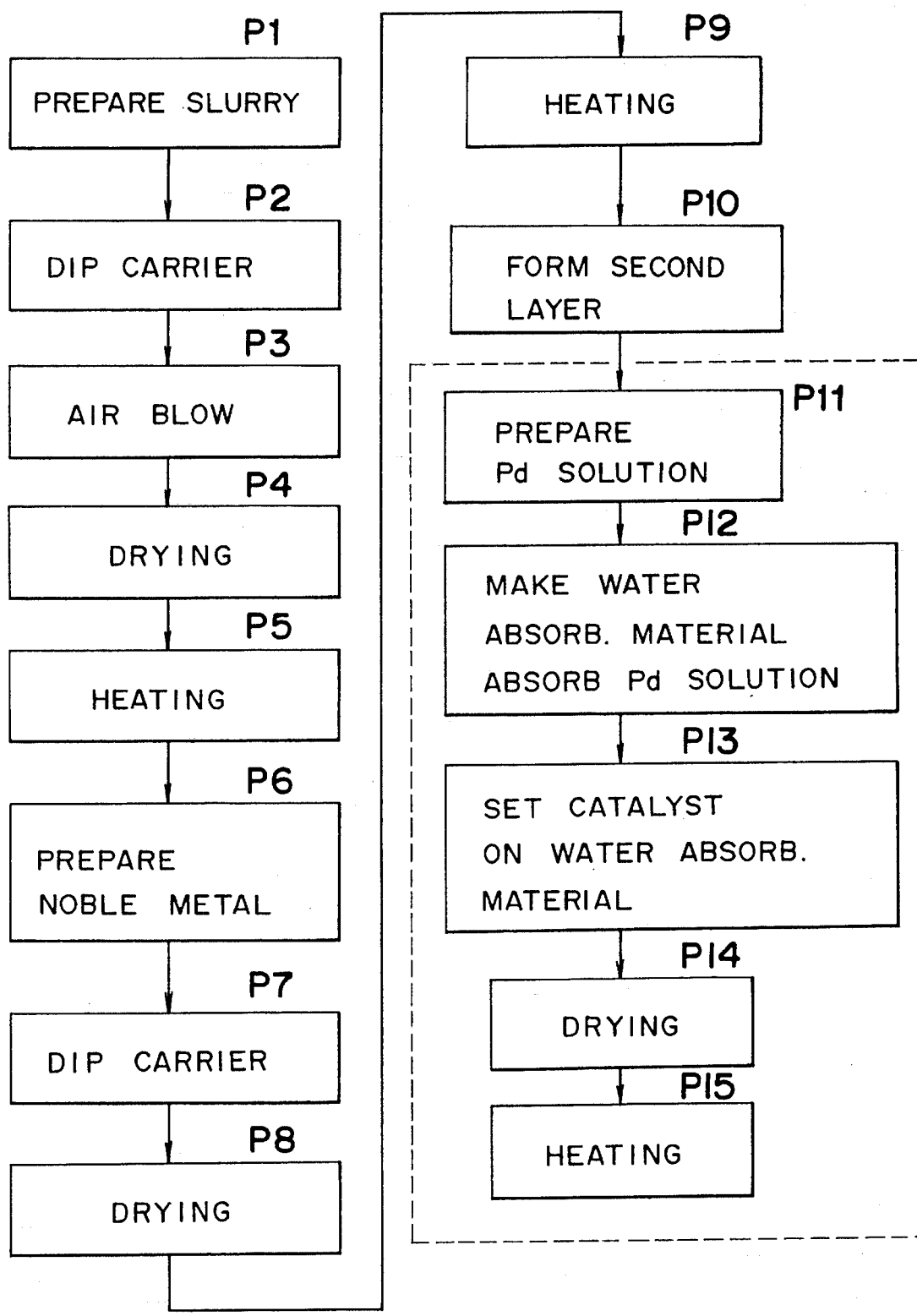
FIG. 5 is a flow diagram indicative of the manufacturing processes of the first or second catalyst.

(a) The first catalyst coating layer is formed by a method similar to the processes P1–P9 as shown in FIG. 5.

(b) A solution of palladium chloride is added to and mixed with cerium oxide ($C_eO_2$) powder, and is dried. Upon crushing, the cerium oxide ($C_eO_2$) powder supporting or fixing palladium is prepared.

(c) 540 grams of cerium oxide powder supporting palladium, 60 grams of boehmite and 1 liter of water are mixed, and 10 milliliters of nitric acid is added thereto, thereby preparing a slurry.

(d) A monolithic carrier, on which the first catalyst coating layer is formed, is dipped into the slurry, dried and heated, thereby forming the second catalyst coating layer. In this event, the second catalyst coating layer is regulated to be 28% by weight with respect to the monolithic carrier and the amount of palladium is uniformly regulated to be 1.0 g/l.

Figure 9:
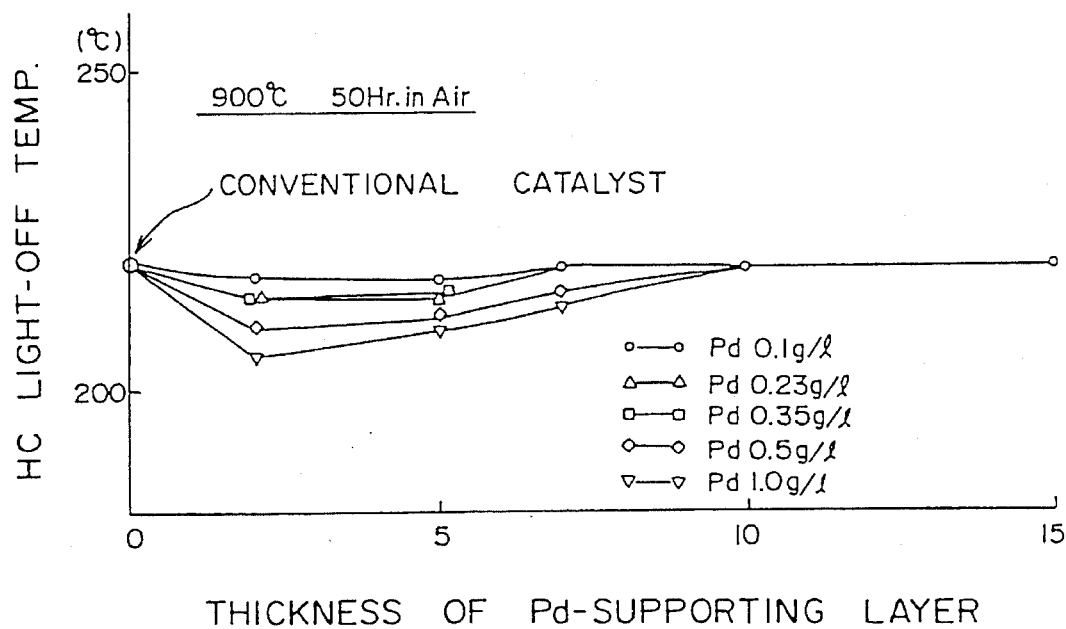
FIG. 9 is a graph similar to FIG. 8, which was obtained after the catalysts of FIG. 8 were placed in air at 900° C. for 50 hours.

FIG. 9 is a graph indicating the results of measurements of the HC light-off temperature obtained after the above exhaust gas purifying catalysts were placed in air at 900° C. for 50 hours.

As is clear from FIGS. 8 and 9, when the amount of supported palladium is less than 0.35 g/l, the effect of enhancing the low-temperature activity is low. When the amount of supported palladium exceeds 1.0 g/l, the effect of enhancing the low-temperature activity is nearly maximized. The amount of supported palladium is, therefore, properly selected in the range of 0.35–1.0 g/l, preferably in the range of 0.5–1.0 g/l. The thickness of the palladium-supporting layer is properly selected in the range of 2–7 mm, preferably in the range of 2–5 mm, because it is difficult to highly accurately regulate the thickness of the palladium-supporting layer to be less than 2 mm in manufacturing processes and a layer having a thickness greater than 7 mm has a low effect of enhancing the low-temperature activity.

For comparison with the above-described embodiment, Table 1 shows the results of measurements of the low-temperature activity and the purification ratio with respect to three types of catalyst samples prepared substantially in the conventional method. The method of measurement will be described later.

(1) Catalyst Sample 1

Figure 10:
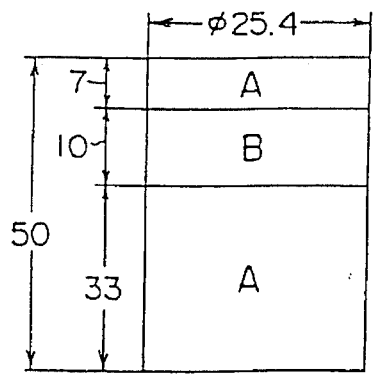
FIGS. 10 to 12 are schematic elevational views of conventional catalyst samples prepared for comparison with the catalyst according to the present invention.

As shown in FIG. 10, a single catalyst layer containing alumina as a base material is formed on a columnar monolithic carrier having a diameter of 25.4 mm and a height of 50 mm. The catalyst layer includes two A-layers each having a relatively low catalyst concentration and a B-layer having a relatively high catalyst concentration. These layers are formed in the order of an A-layer (7 mm), a B-layer (10 mm) and an A-layer (33 mm) from the exhaust gas inlet side in the longitudinal direction of the monolithic carrier. The compositions of noble metal catalysts of the A-layer and of the B-layer are as follows.

<A-layer>

Pt: 0.25 g/1178 ml

Pd: 0.25 g/1178 ml

Rh: 0.05 g/1178 ml

Pt/Pd/Rh=4.5/4.5/1.0

Content of Noble Metal Catalyst: 0.46 g/l

<B-layer>

Pt: 0.5 g/1178 ml

Pd: 0.5 g/1178 ml

Rh: 0.1 g/1178 ml

Pt/Pd/Rh=4.5/4.5/1.0

Content of Noble Metal Catalyst: 0.92 g/l (2) Catalyst Sample 2

Figure 11:
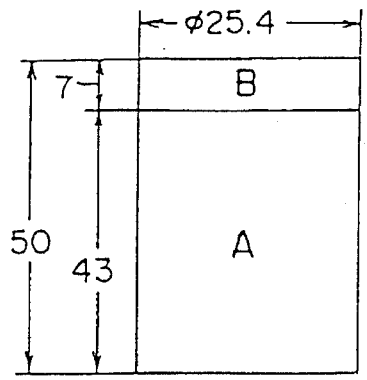

As shown in FIG. 11, a single-coating catalyst layer containing alumina as a base material is formed on a columnar monolithic carrier having a diameter of 25.4 mm and a height of 50 mm. A B-layer (7 mm) and an A-layer (43 mm) are formed in this order from the exhaust gas inlet side in the longitudinal direction of the monolithic carrier. The compositions of noble metal catalysts of the A-layer and of the B-layer are the same as those of the sample 1.

(3) Catalyst Sample 3

Figure 12:
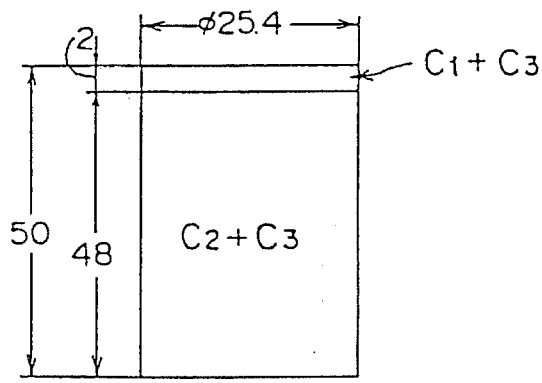
Figure 13:
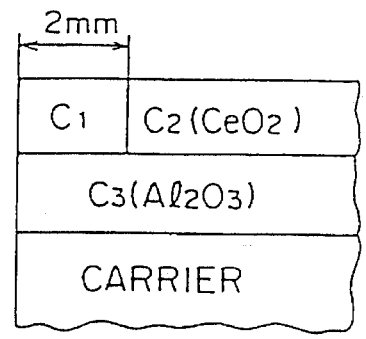
FIG. 13 is a schematic fragmentary elevational view of the conventional catalyst sample of FIG. 12.

As shown in FIGS. 12 and 13, a double-coating catalyst layer consisting of a first layer $C_3$ containing alumina as a base material and a second layer $C_1+C_2$ containing cerium oxide as a base material is formed on a columnar monolithic carrier having a diameter of 25.4 mm and a height of 50 mm. The $C_3$-layer is coated on the monolithic carrier and the $C_1$-layer is coated on the $C_3$-layer from the exhaust gas inlet end to a location 2 mm apart therefrom in the longitudinal direction of the monolithic carrier. The $C_2$-layer having a width of 48 mm is coated on the $C_3$-layer on the exhaust gas outlet side and adjoins the $C_1$-layer. The compositions of noble metal catalysts of the $C_1$-layer and of the $C_3$-layer are as follows. The $C_2$-layer contains no noble metal catalyst component.

<$C_1$-layer>

Pt/Pd/Rh=4.5/4.5/1/0

Content of Noble Metal Catalyst: 0.5 g/l

<$C_3$-layer>

Pt/Rh=5.0/1.0

Content of Noble Metal Catalyst: 0.9 g/l

Hereupon, the low-temperature activity of catalysts was evaluated by the light-off temperature at which 50% of HC, CO or NOx contained in exhaust gases can be purified at an air-fuel ratio of 14.7. As described previously, as the light-off temperature is lower, the low-temperature activity is superior. The above measurements were conducted after each of the catalyst samples was placed in air at 900° C. for 50 hours.

| Exh. Gas Conp. | HC | | CO | | NOx | |
|---|---|---|---|---|---|---|
| Test | I(°C.) | II(%) | I(°C.) | II(%) | I(°C.) | II(%) |
| Sample 1 | 320 | 82 | 290 | 69 | 298 | 71 |
| Sample 2 | 300 | 88 | 305 | 72 | 280 | 78 |
| Sample 3 | 280 | 96 | 255 | 80 | 240 | 81 |

NOTE
Test I: light-off temperature (low-temperature activity)
Test II: purification ratio (this ratio is the reduction ratio of HC, CO or NOx when the inlet temperature of exhaust gases is fixed at 400° C.)

As is clear from Table 1, the light-off temperature of each of the samples 1–3 prepared by the conventional method is generally high, and therefore, the low-temperature activity thereof is low. Furthermore, the ratio of purification of exhaust gases is low.

For example, the catalyst sample 3 has an HC light-off temperature of 280° C., which is lower than that of any other samples. However, the catalysts of FIG. 9 according to the present invention have respective HC light-off temperatures less than 220° C., and the lowest HC light-off temperature is about 200° C. In view of these facts, the low-temperature activity of catalysts according to the present invention is found to be considerably superior to that of catalysts prepared by the conventional method.

In the sample 2, although the B-layer (7 mm) having a high catalyst concentration is formed in the vicinity of the exhaust gas inlet end, the effect of enhancing the low-temperature activity can hardly be recognized. It is known from this fact that the effect of enhancing the low-temperature activity cannot generally be obtained merely by raising the catalyst concentration on the exhaust gas inlet side. In other words, the superior effect of enhancing the low-temperature activity cannot be obtained until only the palladium concentration is raised at the exhaust gas inlet end, like the catalysts according to the present invention.

In the sample 3, although the catalyst layer is made to be a double coating layer, as in the above-described embodiment of the present invention, the effect of enhancing the low-temperature activity is very low. Accordingly, the low-temperature activity cannot generally be enhanced merely by making a double coating layer of the catalyst layer. It is, therefore, known that the superior low-temperature activity can be obtained by forming an area having a high palladium concentration at the exhaust gas inlet end and by making a double coating layer of such an area.

In this embodiment, although the portion (non-palladium layer 14) other than the palladium-supporting layer 13 contains no palladium, palladium may be distributed at a low concentration in the entire second catalyst coating layer 12 and a palladium-supporting layer having a high concentration may be formed in the vicinity of the exhaust gas inlet end.

Furthermore, only a single catalyst coating layer containing cerium oxide ($C_eO_2$) as a main component and platinum and rhodium as a catalyst component may be formed without forming two catalyst coating layers. In this case, a palladium-supporting layer is formed by making palladium be supported by the catalyst coating layer at a location near the exhaust gas inlet end.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An exhaust gas purifying catalyst to be used in an exhaust gas purifying device to purify exhaust gas to be passed through said catalyst, said catalyst comprising:

a porous monolithic carrier having opposite exhaust gas inlet and outlet ends and a longitudinal axis;

a catalyst coating layer formed on a surface of said monolithic carrier and containing a catalytic material capable of purifying exhaust gases; and said catalyst coating layer including, at an upstream side thereof relative to a direction of flow of exhaust gases and at a location at said exhaust gas inlet end of said monolithic carrier, a palladium-supporting layer having a thickness of from 2 mm to 7 mm in a direction of said longitudinal axis and having palladium as a catalytic material, said palladium-supporting layer having an upstream end located at said exhaust gas inlet end of said monolithic carrier, said palladium being distributed substantially uniformly in said palladium-supporting layer at a high concentration in an amount of from 0.35 g/l to 1.0 g/l, said catalyst coating layer further including a non-palladium layer adjoining said palladium-supporting layer at said downstream end thereof, said non-palladium layer including at least one catalytic material other than palladium, and the palladium concentration of said catalyst coating layer being greatest in said palladium-supporting layer.

2. A catalyst as claimed in claim 1, wherein said non-palladium layer includes platinum and rhodium as catalyst components.

3. A catalyst as claimed in claim 1, wherein said non-palladium layer contains no palladium.

4. A catalyst as claimed in claim 1, wherein said non-palladium layer contains palladium at a concentration lower than said concentration of palladium in said palladium-supporting layer.

5. A catalyst as claimed in claim 1, wherein said catalyst coating layer includes a first layer of alumina containing platinum and rhodium and a second layer of cerium oxide formed on said first layer, and wherein said palladium-supporting layer is formed in said second layer.

6. A catalyst as claimed in claim 1, wherein said amount of palladium in said palladium-supporting layer is from 0.5 g/l to 1.0 g/l, and said thickness of said palladium-supporting layer is from 2 mm to 5 mm.

7. A catalyst as claimed in claim 1, wherein said palladium-supporting layer is located in an upstream most end of said catalyst coating layer, relative to the flow of exhaust gas therethrough.

8. A catalyst as claimed in claim 1, wherein said at least one catalytic material is selected from a group consisting of platinum and rhodium.

9. A catalyst as claimed in claim 1, wherein said thickness of said palladium-supporting layer is substantially uniform transversely of said longitudinal axis.

10. An exhaust gas purifying catalyst to be used in an exhaust gas purifying device to purify exhaust gas to be passed through said catalyst, said catalyst comprising:

a porous monolithic carrier having opposite exhaust gas inlet and outlet ends and a longitudinal axis;

a first catalyst coating layer formed on a surface of said monolithic carrier and containing a catalytic material capable of purifying exhaust gases;

a second catalyst coating layer formed on a surface of said first catalyst coating layer; and said second catalyst coating layer including, at an upstream end thereof relative to a direction of flow of exhaust gases and at a location at said exhaust gas inlet end of said monolithic carrier, a palladium-supporting layer having a substantially uniform thickness in a direction of said longitudinal axis of said monolithic carrier and having palladium as a catalytic material, said palladium-supporting layer having an upstream end located at said exhaust gas inlet end of said monolithic carrier, said palladium being distributed substantially uniformly in said palladium-supporting layer at a high concentration in an amount of from 0.35 g/l to 1.0 g/l, said catalyst coating layer further including a non-palladium layer adjoining said palladium-supporting layer at said downstream end thereof, said non-palladium layer including at least one catalytic material other than palladium, and the palladium concentration of said second catalyst coating layer being greatest in said palladium-supporting layer.

11. A catalyst as claimed in claim 10, wherein said non-palladium layer includes platinum and rhodium as catalyst components.

12. A catalyst as claimed in claim 10, wherein said non-palladium layer contains no palladium.

13. A catalyst as claimed in claim 10, wherein said non-palladium layer contains palladium at a concentration lower than said concentration of palladium in said palladium-supporting layer.

14. A catalyst as claimed in claim 10, wherein said thickness of said palladium-supporting layer is from 2 mm to 7 mm.

15. A catalyst as claimed in claim 10, wherein said amount of palladium in said palladium-supporting layer is from 0.5 g/l to 1.0 g/l, and said thickness of said palladium-supporting layer is from 2 mm to 5 mm.

16. A catalyst as claimed in claim 10, wherein said palladium-supporting layer is located in an upstream most end of said catalyst coating layer, relative to the flow of exhaust gas therethrough.

17. A catalyst as claimed in claim 10, wherein said at least one catalytic material is selected from a group consisting of platinum and rhodium.

* * * * *